United States Patent
Hannemann et al.

(10) Patent No.: US 12,322,843 B2
(45) Date of Patent: Jun. 3, 2025

(54) POWER-TO-X SYSTEM WITH AN OPTIMIZED HYDROGEN DRYING AND PURIFYING PROCESS

(71) Applicant: Siemens Energy Global GmbH & Co. KG, Bayern (DE)

(72) Inventors: Frank Hannemann, Rottenbach (DE); Stefan Schmied, Offenhausen (DE); Andreas Volkmann, Erlangen (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 610 days.

(21) Appl. No.: 17/773,095

(22) PCT Filed: Sep. 29, 2020

(86) PCT No.: PCT/EP2020/077190
§ 371 (c)(1),
(2) Date: Apr. 29, 2022

(87) PCT Pub. No.: WO2021/089245
PCT Pub. Date: May 14, 2021

(65) Prior Publication Data
US 2022/0416280 A1 Dec. 29, 2022

(30) Foreign Application Priority Data
Nov. 6, 2019 (DE) ............ 10 2019 217 114.1

(51) Int. Cl.
*H01M 8/0656* (2016.01)
*B01D 53/26* (2006.01)
(Continued)

(52) U.S. Cl.
CPC ........ *H01M 8/0656* (2013.01); *B01D 53/265* (2013.01); *B01D 53/8671* (2013.01);
(Continued)

(58) Field of Classification Search
CPC .......... H01M 8/0656; H01M 8/04029; H01M 8/04126; H01M 8/04201; H01M 2250/10;
(Continued)

(56) References Cited

U.S. PATENT DOCUMENTS

| 5,250,368 A | 10/1993 | Golben et al. |
| 5,900,330 A | 5/1999 | Kagatani |

(Continued)

FOREIGN PATENT DOCUMENTS

| JP | 2001057222 A | 2/2001 |
| WO | 03094263 A2 | 11/2003 |
| WO | 2019011475 A1 | 1/2019 |

OTHER PUBLICATIONS

PCT International Search Report and Written Opinion of International Searching Authority mailed Jan. 11, 2021 corresponding to PCT International Application No. PCT/EP2020/077190 filed Sep. 29, 2020.

*Primary Examiner* — Ian A Rummel
*Assistant Examiner* — Abdul-Rahman Yusuf Waleed Smari
(74) *Attorney, Agent, or Firm* — Wolter Van Dyke Davis, PLLC

(57) ABSTRACT

A power-to-X system having an electrolyzer and an energy converter which are connected together via a hydrogen line. The system additionally has a chemical reactor for catalytically removing oxygen, a first heat exchanger, a water separator, a store, and a humidifier which are connected into the hydrogen line in the stated order one behind the other between the electrolyzer and the energy converter. A second heat exchanger is arranged in the hydrogen line such that a first side of the second heat exchanger is arranged in front of the first heat exchanger and a second side of the second heat exchanger is arranged downstream of the water separator in the hydrogen line.

10 Claims, 2 Drawing Sheets

(51) Int. Cl.
*B01D 53/86* (2006.01)
*C01B 3/50* (2006.01)
*C25B 1/04* (2021.01)
*C25B 15/08* (2006.01)
*H01M 8/04029* (2016.01)
*H01M 8/04082* (2016.01)
*H01M 8/04119* (2016.01)

(52) U.S. Cl.
CPC .............. *C01B 3/50* (2013.01); *C25B 1/04* (2013.01); *C25B 15/081* (2021.01); *C25B 15/083* (2021.01); *C25B 15/085* (2021.01); *H01M 8/04029* (2013.01); *H01M 8/04126* (2013.01); *H01M 8/04201* (2013.01); *B01D 2257/104* (2013.01); *C01B 2203/0435* (2013.01); *C01B 2203/0495* (2013.01); *C01B 2203/066* (2013.01); *H01M 2250/10* (2013.01)

(58) Field of Classification Search
CPC .............. B01D 53/265; B01D 53/8671; B01D 2257/104; C01B 3/50; C01B 2203/0435; C01B 2203/0495; C01B 2203/066; C25B 1/04; C25B 15/081; C25B 15/083; C25B 15/085

See application file for complete search history.

(56) References Cited

U.S. PATENT DOCUMENTS

| | | |
|---|---|---|
| 2002/0051898 A1 | 5/2002 | Moulthrop, Jr. et al. |
| 2007/0000789 A1 | 1/2007 | Libby et al. |
| 2011/0180396 A1 | 7/2011 | Giacomini |
| 2018/0261864 A1* | 9/2018 | Jahnke ................ H01M 8/0656 |

* cited by examiner

POWER-TO-X SYSTEM WITH AN OPTIMIZED HYDROGEN DRYING AND PURIFYING PROCESS

CROSS REFERENCE TO RELATED APPLICATIONS

This application is the US National Stage of International Application No. PCT/EP2020/077190 filed 29 Sep. 2020, and claims the benefit thereof. The International Application claims the benefit of German Application No. DE 10 2019 217 114.1 filed 6 Nov. 2019. All of the applications are incorporated by reference herein in their entirety.

FIELD OF INVENTION

The invention relates to a power-to-X plant comprising an electrolyzer and an energy converter and a process for operation thereof. Power-to-X refers to different options for utilization (in particular storage) in the event of a surplus of renewable energy from solar, wind and hydropower.

BACKGROUND OF INVENTION

Part of these technologies are power-to-gas processes which may be a substantial element for decarbonization or defossilization of the transport and energy sector and are also used for energy storage. A substantial advantage over other storage technologies is the high energy density of hydrogen or other hydrocarbons.

Reconversion of the hydrogen into electricity today employs essentially combustion plants such as for example gas turbines or steam boilers, with the result that the overall chain from production of the hydrogen by electrolysis, via compression, purification and storage of the hydrogen through to reconversion into electricity, for example in a gas turbine, only achieves a very low level of efficiency below 30%.

Another disadvantage of reconversion into electricity via a combustion plant, for example in a gas and steam turbine power plant, is limited flexibility with long start-up and shut-down times and power gradients, this constituting a decisive disadvantage especially in the compensation and storage of renewable energy.

By contrast, fuel cells promise both high flexibility and higher efficiency and can therefore better utilize the fluctuating availability of renewable energy. Today they face the disadvantage of the high capital costs of the overall chain of fuel cell applications in conjunction with electrolysis.

Present-day applications are therefore only employed in the transport sector. Storage in trucks or passenger cars must realize extremely high energy densities to be able to limit storage volumes and allow high driving performance. In the case of hydrogen this is only achievable through high pressures of between 350-750 bar. In order to reliably avoid corrosion from water vapor or oxygen at these high pressures, the hydrogen must be purified and water vapor and oxygen completely removed. This purification is only possible through drying (refrigeration and adsorption drying) and catalytic oxygen removal which results not only in high capital costs but also in hydrogen losses via the catalytic reaction. On account of this complex purification, stationary plants composed of an electrolysis and a fuel cell are often not yet economic.

The storage and reconversion into electricity of hydrogen has hitherto been realized with a plant concept comparable to mobile application. A plant for storage and reconversion into electricity of renewable energy comprises an electrolysis, an optional compressor, a catalytic oxygen remover, a cooling means comprising a water separator, and absorber, a further compressor, a storage means and a fuel cell with a humidifier. Due to the complex plant concept and the high storage pressure the capital costs for stationary applications are very high and economic operation is only possible at very high feed-in tariffs for the reconversion into electricity and very low electricity prices for the production of hydrogen.

SUMMARY OF INVENTION

It is an object of the present invention to provide a power-to-X plant that enables process simplification and helps to significantly reduce capital costs. It is a further object of the present invention to specify a corresponding process for operating such a plant.

The invention achieves the object of providing a power-to-X plant by providing that in such a plant comprising an electrolyzer and an energy converter connected to one another via a hydrogen conduit and further comprising a chemical reactor for catalytic oxygen removal, a first heat exchanger, a water separator, a storage means and a humidifier serially connected into the hydrogen conduit between the electrolyzer and the energy converter in the sequence listed, a second heat exchanger is arranged in the hydrogen conduit such that a first side of the second heat exchanger is arranged upstream of the first heat exchanger and a second side of the second heat exchanger is arranged downstream of the water separator in the hydrogen conduit.

According to the invention the storage of the hydrogen is performed at a pressure level achievable via the electrolysis and without utilization of an additional compressor. Reducing the pressure makes it possible to reduce the purity requirements for the hydrogen since at relatively low pressures (for example <40 bar) a relatively low tendency for corrosion would be expected upon condensation of the water proportion and any residual oxygen from the electrolysis.

The hydrogen produced in the electrolysis is initially freed of residual oxygen through catalytic oxidation of the oxygen with hydrogen. This reaction causes the water proportion and the associated water quantity to increase within the hydrogen stream. The temperature at the outlet of the catalytic oxygen removal is for example between 60° C. and 80° C. and complete saturation of the hydrogen stream is established.

The use of more cost-effective and less corrosion-resistant materials therefore requires superheating of the hydrogen. According to the invention this superheating is achieved by heat recovery/recuperation in conjunction with an interposed temperature reduction to a temperature of for example 5° C.

As a result of the cooling via the first heat exchanger the dew point is reduced and water is condensed out. The hydrogen thus contains less water and is in a saturated state at low temperature.

Finally, the cooled hydrogen stream is heated via the second heat exchanger (recuperator) and passed into the storage means, wherein hydrogen temperatures above 50° C. are achievable. Raising the temperature superheats the hydrogen and condensation of water in the storage means and the connecting pipe conduits can therefore be prevented.

The energy converter is advantageously a fuel cell.

In an advantageous embodiment the first heat exchanger is connected to a refrigeration unit (chiller). This results in significant cooling of the hydrogen stream and thus also insignificant drying since water is condensed out in appreciable amounts.

In an alternative advantageous embodiment of the invention a cooling water conduit is connected to the first heat exchanger. Compared to the use of a refrigeration unit the first heat exchanger operated with cooling water permits only a smaller reduction in the hydrogen temperature to, for example, <30° C. and less water vapor condenses out and the saturation temperature/the dew point are at a higher temperature level. There is thus a higher risk that the temperature in the storage means falls below this temperature, that water condenses out and that corrosion can occur. To safely avoid corrosion in this embodiment it is necessary either to employ a higher quality and more corrosion-resistant material or to ensure a higher temperature by means of for example trace heating or other suitable measures. However, the higher saturation temperature and associated water content means that this embodiment also requires less saturation of the hydrogen stream before entry into the fuel cell.

The water proportion condensed out downstream of the first heat exchanger may advantageously be reused for humidifying the hydrogen stream before entry into the fuel cell. To this end the water separator and the humidifier are connected to one another via a first water conduit. It is advantageous when, in addition, a second water conduit leads to the humidifier for the case where the separated water quantity is insufficient for humidifying the retrieved hydrogen for optimal use in the fuel cell.

The invention achieves the object of providing a process via a process for storage and flexible utilization of renewable energies comprising the steps of:
- decomposing water into hydrogen and oxygen by supplying electrical energy,
- freeing the hydrogen produced from residual oxygen by catalytic oxidation of the oxygen with hydrogen,
- cooling the hydrogen by indirect heat transfer to a cooling medium,
- separating water from the cooled hydrogen,
- storing the hydrogen,
- retrieving and humidifying the hydrogen and
- supplying the humidified hydrogen to an energy converter, wherein heat is removed from the hydrogen before the cooling with the cooling medium and the heat removed is utilized recuperatively for heating the hydrogen after the separation of water.

The advantages associated with the process according to the invention are the same as those of the apparatus according to the invention.

It is advantageous when water separated from hydrogen is used for humidifying retrieved hydrogen before chemical energy is converted into electrical energy.

It is further advantageous when a cooling medium passes through a refrigeration unit before it is used for cooling the hydrogen.

It may alternatively be advantageous when cooling water is used as cooling medium.

BRIEF DESCRIPTION OF THE DRAWINGS

The invention will now be more particularly elucidated by way of example with reference to the drawings. In the figures which are schematic and not to scale.

DETAILED DESCRIPTION OF INVENTION

Figure 1:
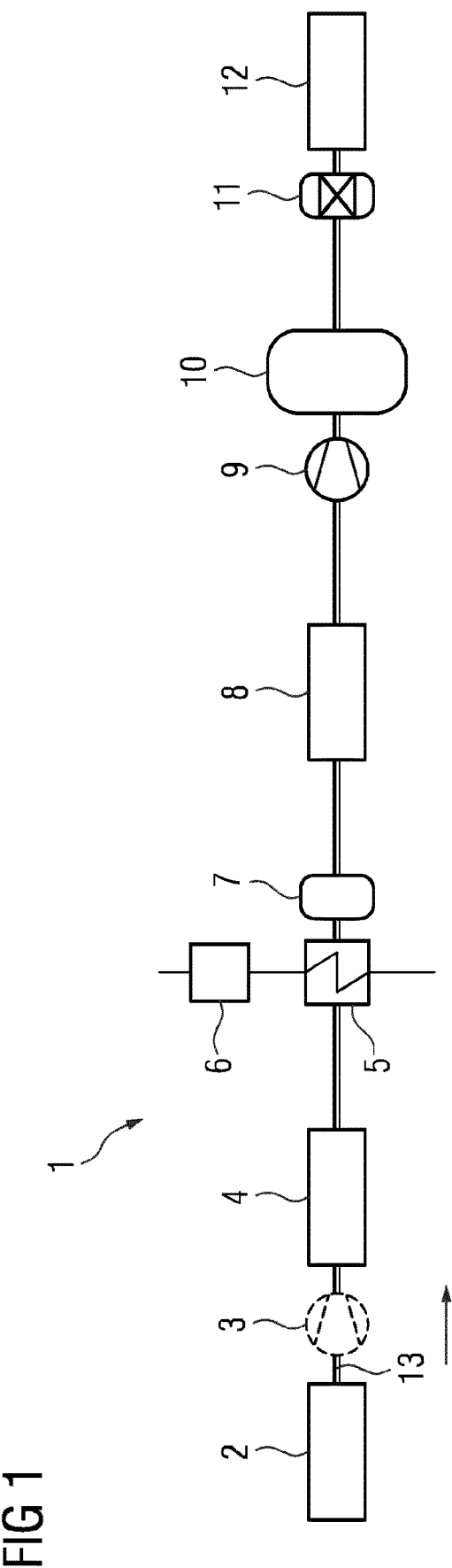
FIG. 1 shows a power-to-X plant comprising an electrolyzer and an energy converter according to the prior art.

FIG. 1 is a schematic and exemplary diagram of a power-to-X Plant 1 for storage and reconversion into electricity of renewable energy according to the prior art. The power-to-X plant 1 comprises an electrolyzer 2, a first compressor 3, a chemical reactor 4 for catalytic oxygen removal, a first heat exchanger 5 as a cooling means with an upstream refrigeration unit 6 (chiller) and with a water separator 7, an adsorber 8, a second compressor 9, a storage means 10 and a fuel cell as an energy converter 12 with a humidifier 11. These components are connected to one another via a hydrogen conduit 13.

Figure 2:
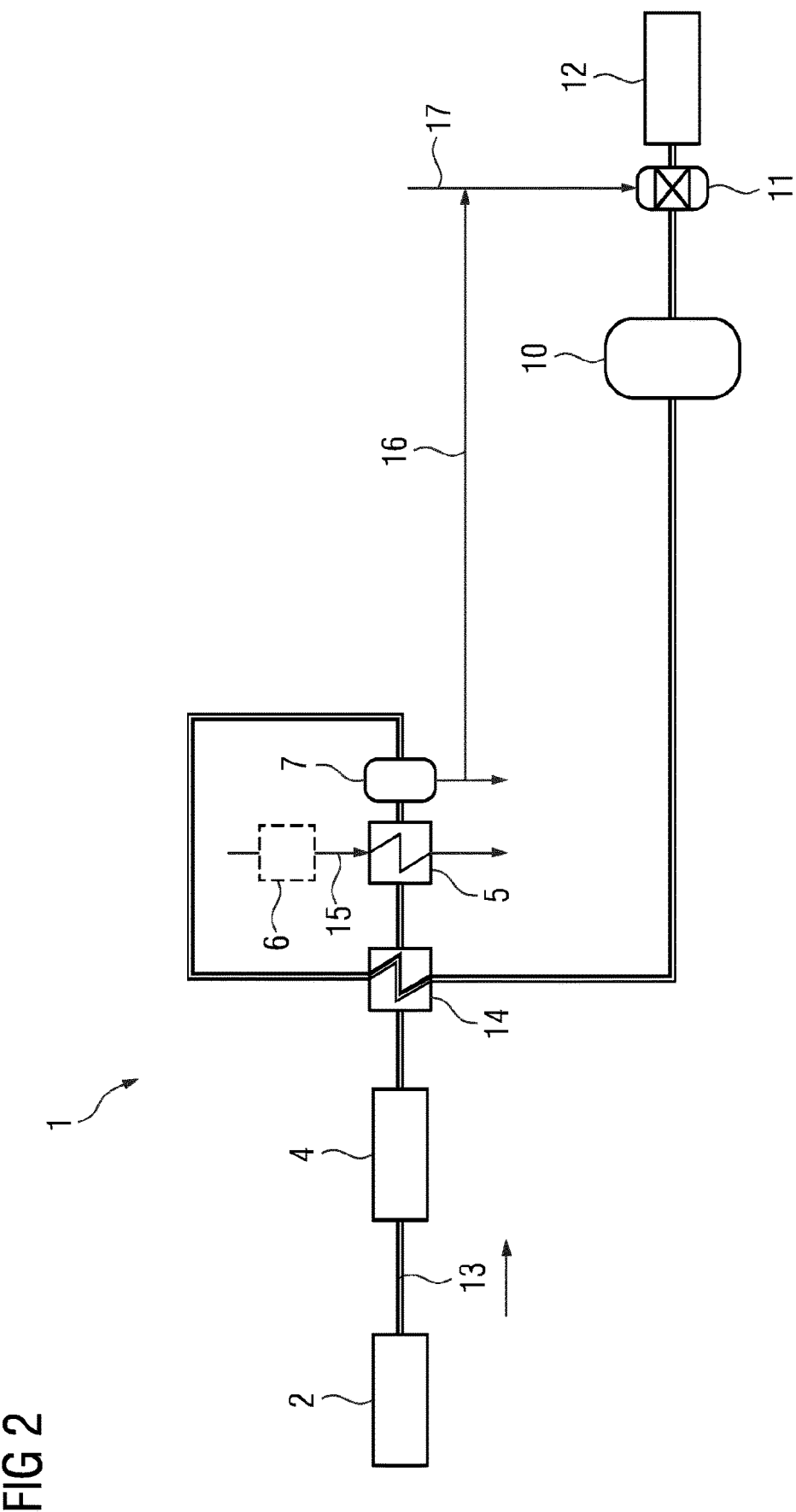
FIG. 2 shows a power-to-X plant comprising an electrolyzer and an energy converter according to the invention.

FIG. 2 shows a power-to-X plant 1 comprising an electrolyzer 2 and an energy converter 12 according to the invention. In contrast to the prior art of FIG. 1, the storage of the hydrogen is performed at a pressure level achievable via the electrolysis and without utilization of a first compressor 3.

Thus, in a first step in the power-to-X plant 1 according to the invention the hydrogen produced in the electrolyzer 2 is freed of residual oxygen by catalytic oxidation in the chemical reactor 4 without previously having been compressed.

Subsequently, in a second heat exchanger 14 a first pass results in a cooling, and a second pass results in a heating, of the hydrogen stream. Interposed in the heat recovery or recuperation are a temperature reduction of the hydrogen stream in the first heat exchanger 5 (optionally with an upstream refrigeration unit 6 or merely via a cooling water conduit 15) and a water separator 7.

In the next step the hydrogen stream is passed into the storage means 10.

The water proportion condensed out after the first heat exchanger 5 and removed from the hydrogen stream in the water separator 7 may be reused for humidifying the hydrogen stream in the humidifier arranged upstream of the energy converter 12 (fuel cell).

The invention claimed is:

1. A power-to-X plant comprising:
   an electrolyzer and an energy converter connected to one another via a hydrogen conduit,
   a chemical reactor for catalytic oxygen removal,
   a first heat exchanger,
   a water separator,
   a storage means, and
   a humidifier serially connected into the hydrogen conduit between the electrolyzer and the energy converter in the sequence listed,
   wherein a second heat exchanger is arranged in the hydrogen conduit such that a first side of the second heat exchanger is arranged upstream of the first heat exchanger and a second side of the second heat exchanger is arranged downstream of the water separator in the hydrogen conduit.

2. The power-to-X plant as claimed in claim 1, wherein the energy converter is a fuel cell.

3. The power-to-X plant as claimed in claim 1, wherein the first heat exchanger is connected to a refrigeration unit.

4. The power-to-X plant as claimed in claim 1, wherein a cooling water conduit is connected to the first heat exchanger.

5. The power-to-X plant as claimed in claim 1,
   wherein the water separator and the humidifier are connected to one another via a first water conduit.
6. The power-to-X plant as claimed in claim 5,
   wherein a second water conduit leads to the humidifier.
7. A process for storage and flexible utilization of renewable energy, comprising:
   decomposing water into hydrogen and oxygen by supplying electrical energy,
   freeing the hydrogen produced from residual oxygen by catalytic oxidation of the oxygen with hydrogen,
   cooling the hydrogen by indirect heat transfer to a cooling medium,
   separating water from the cooled hydrogen,
   storing the hydrogen,
   retrieving and humidifying the hydrogen, and
   converting chemical energy into electrical energy by the humidified hydrogen,
   wherein heat is removed from the hydrogen before the cooling with the cooling medium and the heat removed is utilized recuperatively for heating the hydrogen after the separating of water and before the storing.
8. The process as claimed in claim 7,
   wherein water separated from hydrogen is used for humidifying retrieved hydrogen before chemical energy is converted into electrical energy.
9. The process as claimed in claim 7,
   wherein the cooling medium passes through a refrigeration unit before it is used for cooling the hydrogen.
10. The process as claimed in claim 7,
    wherein cooling water is used as the cooling medium.

* * * * *